(12) United States Patent
Gabe

(10) Patent No.: US 8,818,032 B2
(45) Date of Patent: Aug. 26, 2014

(54) IMAGE PROCESSING SYSTEM, IMAGE PROCESSING APPARATUS AND SERVER IN THE IMAGE PROCESSING SYSTEM, AND DATA CONTROL METHOD AND STORAGE MEDIUM STORING PROGRAM THEREOF

(75) Inventor: Hanae Gabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 13/439,950

(22) Filed: Apr. 5, 2012

(65) Prior Publication Data

US 2012/0275647 A1  Nov. 1, 2012

(30) Foreign Application Priority Data

Apr. 27, 2011  (JP) .................................. 2011-100134

(51) Int. Cl.
*G06K 9/00* (2006.01)
*H04N 1/40* (2006.01)

(52) U.S. Cl.
USPC .......................................... 382/103; 358/448

(58) Field of Classification Search
USPC ................. 382/100, 103, 162, 235, 276, 307; 358/3.23, 448, 462, 530
See application file for complete search history.

(56) References Cited

U.S. PATENT DOCUMENTS 8,019,904 B2 * 9/2011 Iizuka ............................... 710/8
2009/0296150 A1 * 12/2009 Shudo ......................... 358/1.15

FOREIGN PATENT DOCUMENTS

JP  2001-154541 A  6/2001
JP  2005-157569 A  6/2005

* cited by examiner

*Primary Examiner* — Abolfazl Tabatabai

(74) *Attorney, Agent, or Firm* — Carter, DeLuca, Farrell & Schmidt, LLP

(57) ABSTRACT

When an image processing apparatus transmits information about image data stored therein to a server, the server determines whether or not the image data contains confidential information, and transmits the determination result to the image processing apparatus. When the image processing apparatus receives, from the server, determination result indicating whether or not the image data contains confidential information, then if the determination result indicates that the image data contains specific information, the image processing apparatus limits use of the image data.

12 Claims, 12 Drawing Sheets

F I G. 1
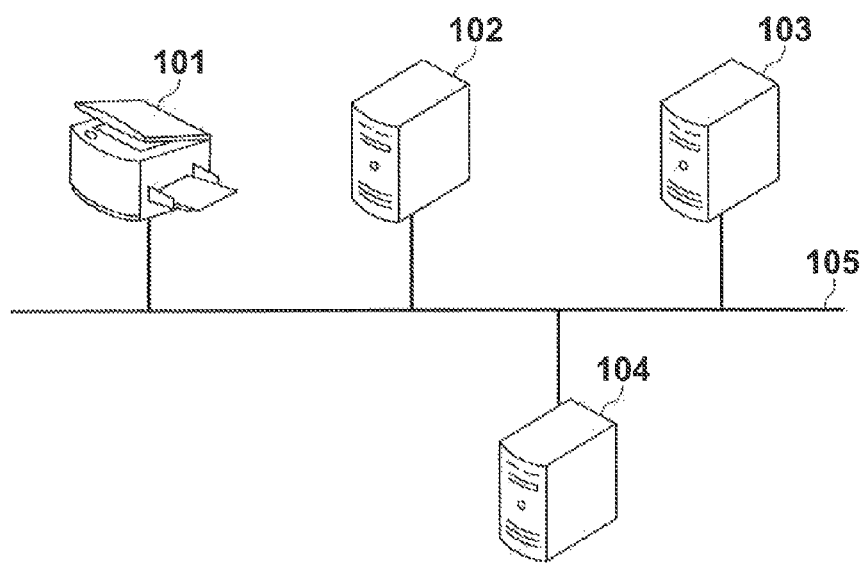

FIG. 3A

FIRST SCANNED DOCUMENT — 301

| IMAGE ATTRIBUTE | | 302 |
|---|---|---|
| IMAGE FORMAT | JPEG (0304) | 303 |
| RESOLUTION | X=600, Y=600 (0306) | 304 |
| IMAGE SIZE | X=4960, Y=7040 (0308) | 305 |

SECOND SCANNED DOCUMENT — 306

| IMAGE ATTRIBUTE | | 308 |
|---|---|---|
| IMAGE FORMAT | JPEG |
| RESOLUTION | X=600, Y=600 |
| IMAGE SIZE | X=4960, Y=7040 |

THIRD SCANNED DOCUMENT — 307

| IMAGE ATTRIBUTE | | 309 |
|---|---|---|
| IMAGE FORMAT | JPEG |
| RESOLUTION | X=600, Y=600 |
| IMAGE SIZE | X=4960, Y=7040 |

FIG. 3B

| JOB LOG | | 310 |
|---|---|---|
| JOB TYPE | COPY | 311 |
| USER ID | 0123456789 | 312 |
| JOB START TIME | 2010/06/22 10:05:40 | 313 |
| JOB END TIME | 2010/06/22 10:05:50 | 314 |
| JOB EXECUTION RESULT | OK | 315 |
| NUMBER OF DOCUMENT SHEETS | 3 | 316 |
| NUMBER OF OUTPUT COPIES | 2 | 317 |
| IMAGE LOG ID | 00000001 | 318 |
| PRESENCE OR ABSENCE OF IMAGE LOG | YES | 319 |

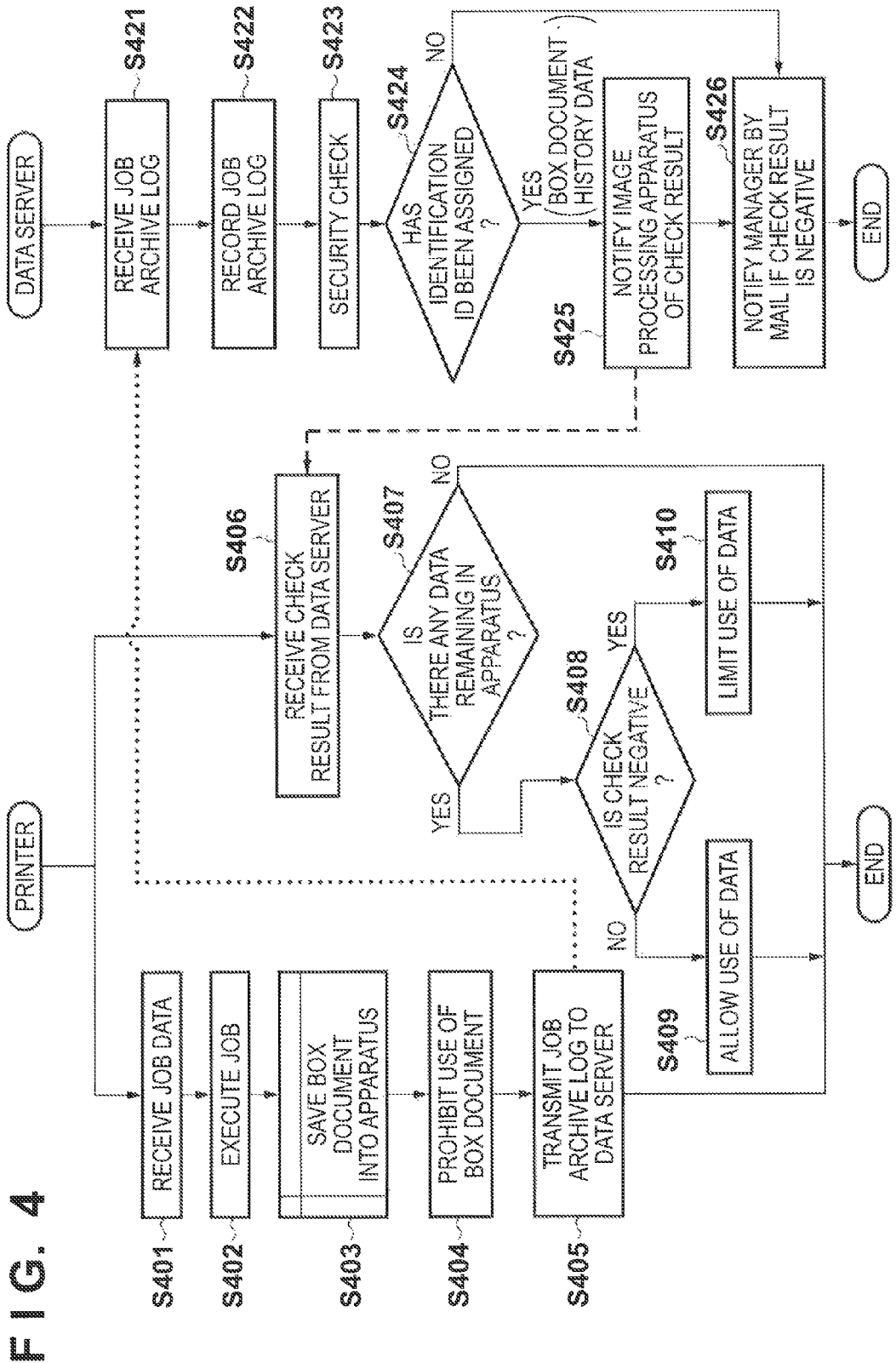

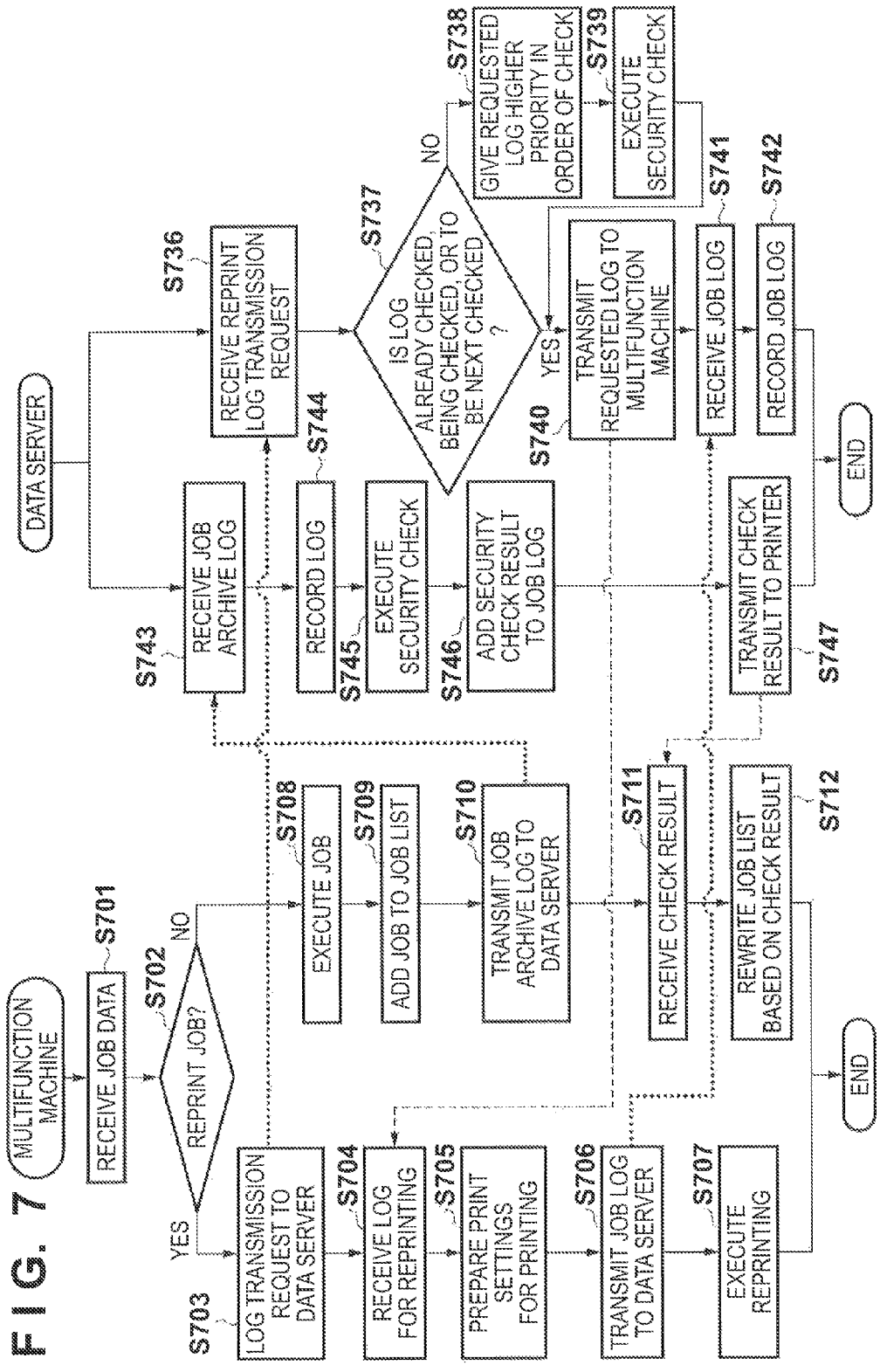

FIG. 8A
| IMAGE ATTRIBUTE | |
|---|---|
| IMAGE FORMAT | JPEG |
| RESOLUTION | X=600, Y=1200 |
| IMAGE SIZE | X=2480, Y=7040 |
FIG. 8B
| JOB LOG | |
|---|---|
| JOB TYPE | Copy |
| USER ID | 0123456789 |
| JOB START TIME | 2010/06/23 10:15:10 |
| JOB END TIME | 2010/06/23 10:15:20 |
| JOB EXECUTION RESULT | OK |
| NUMBER OF DOCUMENT SHEETS | 1 |
| NUMBER OF OUTPUT COPIES | 1 |
| IMAGE LOG ID | 00000002 |
| PRESENCE OR ABSENCE OF IMAGE LOG | YES |
FIG. 8C
| SETTING LOG | |
|---|---|
| PRINT MODE | 2in1 opening=1 detail=1 |
| | FullColor |
| | StapleSort |
| DOCUMENT SIZE | A4 |
| OUTPUT SIZE | A4 |

| IMAGE ATTRIBUTE | |
|---|---|
| IMAGE FORMAT | JPEG |
| RESOLUTION | X=600, Y=1200 (0904) |
| IMAGE SIZE | X=2480, Y=7040 (0906) |

| JOB LOG | |
|---|---|
| JOB TYPE | Copy |
| USER ID | 0123456789 |
| JOB START TIME | 2010/06/23 10:15:10 |
| JOB END TIME | 2010/06/23 10:15:20 |
| JOB EXECUTION RESULT | OK |
| NUMBER OF DOCUMENT SHEETS | 1 |
| NUMBER OF OUTPUT COPIES | 1 |
| IMAGE LOG ID | 00000002 |
| PRESENCE OR ABSENCE OF IMAGE LOG | YES |
| PRINT MODE | 2in1 opening=1 detail=1 |
| | FullColor |
| | StapleSort |
| DOCUMENT SIZE | A4 |
| OUTPUT SIZE | A4 |

FIG. 11

| APPARATUS TYPE ID | OUTPUT PRINTER TYPE | COMPATIBLE PRINTER TYPE | BW / CL | NETWORK ID |
|---|---|---|---|---|
| #1 | A | #2, #6 | BLACK AND WHITE | Network1 |
| #2 | B | #1, #6 | BLACK AND WHITE | Network1 |
| #3 | C | #4, #5 | COLOR | Network1 |
| #4 | D | #3, #4 | COLOR | Network1 |
| #5 | E | #3, #5 | COLOR | Network1 |
| #6 | F | #1, #2 | BLACK AND WHITE | Network2 |

FIG. 12A

| HISTORY | YOUR HISTORY | | |
|---|---|---|---|
| NO. | DATE | JOB NAME | USER NAME |
| 0001 | 11/06 15:20 | ○○○ | EMPLOYEE A |
| 0002 | 11/06 15:29 | ○●○ | EMPLOYEE B |
| 0003 | 11/08 14:00 | ★☆○ | EMPLOYEE A |

[MORE] [CANCEL] [REPRINT]

FIG. 12B

| HISTORY | YOUR HISTORY | | |
|---|---|---|---|
| NO. | DATE | JOB NAME | USER NAME |
| 0001 | 11/06 15:20 | ○○○ | EMPLOYEE A |
| 0002 | 11/08 14:00 | ★☆○ | EMPLOYEE A |

[MORE] [CANCEL] [REPRINT]

FIG. 12C

| HISTORY | YOUR HISTORY | | | |
|---|---|---|---|---|
| NO. | DATE | JOB NAME | USER NAME | PRINTER NAME |
| 0001 | 11/06 15:20 | ○○○ | EMPLOYEE A | A |
| 0002 | 11/06 15:29 | ○●○ | EMPLOYEE B | B |

[MORE] [CANCEL] [REPRINT]

FIG. 12D

| HISTORY | YOUR HISTORY | | | |
|---|---|---|---|---|
| NO. | DATE | JOB NAME | USER NAME | PRINTER NAME |
| 0001 | 11/08 14:00 | ★☆○ | EMPLOYEE A | C |
| 0002 | 11/28 16:30 | ▲▲▲ | EMPLOYEE A | G |
| 0003 | 12/01 18:25 | ◆■○ | EMPLOYEE A | E |

[MORE] [CANCEL] [REPRINT]

IMAGE PROCESSING SYSTEM, IMAGE PROCESSING APPARATUS AND SERVER IN THE IMAGE PROCESSING SYSTEM, AND DATA CONTROL METHOD AND STORAGE MEDIUM STORING PROGRAM THEREOF

BACKGROUND OF THE INVENTION

1. Field of the Invention

The present invention relates to image processing systems that process image data containing confidential information, image processing apparatuses and servers in the image processing systems, and data control methods and storage media storing programs thereof.

2. Description of the Related Art

In recent years, legislative regulations such as personal information protection laws etc, have imposed an increasing necessity for companies to prevent leakage of various business information handled by the companies. On the other hand, as image processing apparatuses have become ubiquitous, anyone can easily copy and send documents. Therefore, it has become considerably important to prevent leakage of information, such as copying and sending of confidential documents, etc. In order to address the information leakage, for example, ail image data read (input) and printed, and sent (output) when copying and sending etc. are performed may be stored in the image processing apparatus to record what process has been processed by whom, when, and where (Japanese Parent Laid-Open No. 2005-157569). Moreover, it may be checked whether or not recorded image data contains confidential information.

There are also a known image processing apparatus having a box function of storing image data and a known image formation apparatus having a reprinting function. For example, image data, from which an image has already been formed, is stored in an image memory provided in a copier etc., and when a user requests additional image formation of the stored image data, the image data is read from, the image memory to perform image formation (Japanese Patent Laid-Open No. 2001-154541).

However, in any conventional configurations, even if it is checked, whether or not input or output image data contains confidential data, a user cannot know the check result before execution of a job when image processing is executed using the image data. Therefore, if the image data contains confidential information, a user needs to check the security of the target image data every time the job is executed.

SUMMARY OF THE INVENTION

The present invention provides an image processing system that efficiently prevents leakage of confidential information, an image processing apparatus and a server in the image processing system, and a data control method and a storage medium storing a program.

The present invention in its first aspect provides an image processing system including an image processing apparatus and a server, wherein the image processing apparatus including: a storage unit configured to store image data, an information transmission unit configured to transmit information about the image data to the server, a result reception unit configured to receive, from the server, a determination result indicating whether or not the image data contains specific information, and a limitation unit configured to limit use of the image data when, the determination result indicates that the image data contains the specific information, and the server including: an information reception unit configured to receive the information about the image data from the image processing apparatus, a determination unit configured to determine whether or not the image data contains the specific information, and a result transmission unit configured to transmit a determination result of the determination unit to the image processing apparatus.

The present invention in its second aspect provides a data control method executable in an image processing system including art image processing apparatus and a server, wherein in the image processing apparatus, a storage step of storing image data, and an information transmission step of transmitting information about the image data to the server, in the server, an information reception step of receiving the information about the image data from the image processing apparatus, a determination step of determining whether or not the image data contains specific information, and a result transmission step of transmitting a determination result of the determination step to the image processing apparatus, and in the image processing apparatus, a result reception step of receiving, from the server, a determination result indicating whether or not the image data contains the specific information, and a limitation step of limiting use of the image data when the determination result indicates that the image data contains the specific information.

The present invention in its third aspect provides an image processing system including an image processing apparatus and a server, wherein the image processing apparatus including: a transmission unit configured to transmit, to the server, image data that, has been subjected to image processing, a display unit configured to obtain and display information about image data that is transmitted from the transmission unit, and is stored in the server, an acceptance unit configured to accept selection of image data to be output, from the information displayed on the display unit, a request unit configured to request the server to determine whether or not image data for which selection is accepted, by the acceptance unit contains specific information, a reception unit configured to, when, the server determines, in response to the request from the request unit, that the image data does not contain the specific information, receive the image data from the server, and a printing unit configured, to print the image data received by the reception unit, and the server including: a storage unit, configured to store the image data transmitted from the transmission unit, a determination unit configured to, when requested, by the request on it to perform the determination, determine whether or not the image data that is stored in the storage unit and for which selection has been accepted by the acceptance unit contains confidential information, and a transmission unit configured to, when the determination unit determines that the image data does not contain confidential information, transmit the image data to the image processing apparatus.

The present invention in its fourth aspect provides an image processing apparatus capable of communicating with a server, comprising: a storage unit configured to store image data, a transmission unit configured to transmit information about the image data to the server, a reception unit configured to receive, from the server, a determination result indicating whether or not the image data contains specific information, and a limitation unit configured to limit use of the image data when the determination result indicates that the image data contains the specific information.

The present invention in its fifth aspect provides a server capable of communicating with an image processing apparatus, comprising: a reception unit configured to receive information about image data from the image processing apparatus, a determination unit configured to determine whether or not the image data contains specific information, and a transmission unit configured to transmit a determination result, of the determination unit to the image processing apparatus.

The present invention in its sixth aspect provides a data control method executable in an image processing apparatus capable of communicating with a server, comprising: a storage step of storing image data, a transmission steps of transmitting information about the image data to the server, a reception step of receiving, from the server, a determination result indicating whether or not the image data contains specific information, and a limitation step of limiting use of the image data when the determination result indicates that the image data contains the specific information.

The present invention in its seventh aspect provides a data control method executable in a server capable of communicating with an image processing apparatus, comprising: a reception step of receiving information about image data from the image processing apparatus, a determination step of determining whether or not the image data contains specific information, and a transmission step of transmitting a determination result of the determination step to the image processing apparatus.

The present invention in its eighth aspect provides a computer readable storage medium storing a program that causes a computer to execute: a storage step of storing image data, a transmission step of transmitting information about the image data to the server, a reception step of receiving, from the server, a determination result indicating whether or not the image data contains specific information, and a limitation step of limiting use of the image data when the determination result indicates that the image data contains the specific information.

The present invention in its ninth aspect provides a computer readable storage medium storing a program that causes a computer to execute: a reception step of receiving information about image data from the image processing apparatus, a determination step of determining whether or not the image data contains specific information, and a transmission step of transmitting a determination result of the determination step to the image processing apparatus.

According to the present invention, leakage of confidential information can be efficiently prevented.

Further features of the present invention will become apparent from the following description of exemplary embodiments with reference to the attached drawings.

BRIEF DESCRIPTION OF THE DRAWINGS

FIG. 1 is a diagram showing a configuration of an image processing system.

FIGS. 3A and 3B are diagrams showing an example job archive log in first embodiment.

FIG. 4 is a flowchart showing a process of limiting use of a box document.

FIG. 7 is a flowchart showing a reprinting process.

FIGS. 8A to 8C are diagrams showing example job archive logs in second embodiment.

FIG. 11 is a table showing compatible apparatus types.

FIGS. 12A to 12D are diagrams showing an example list displayed in the reprinting process.

DESCRIPTION OF THE EMBODIMENTS

Figure 2:
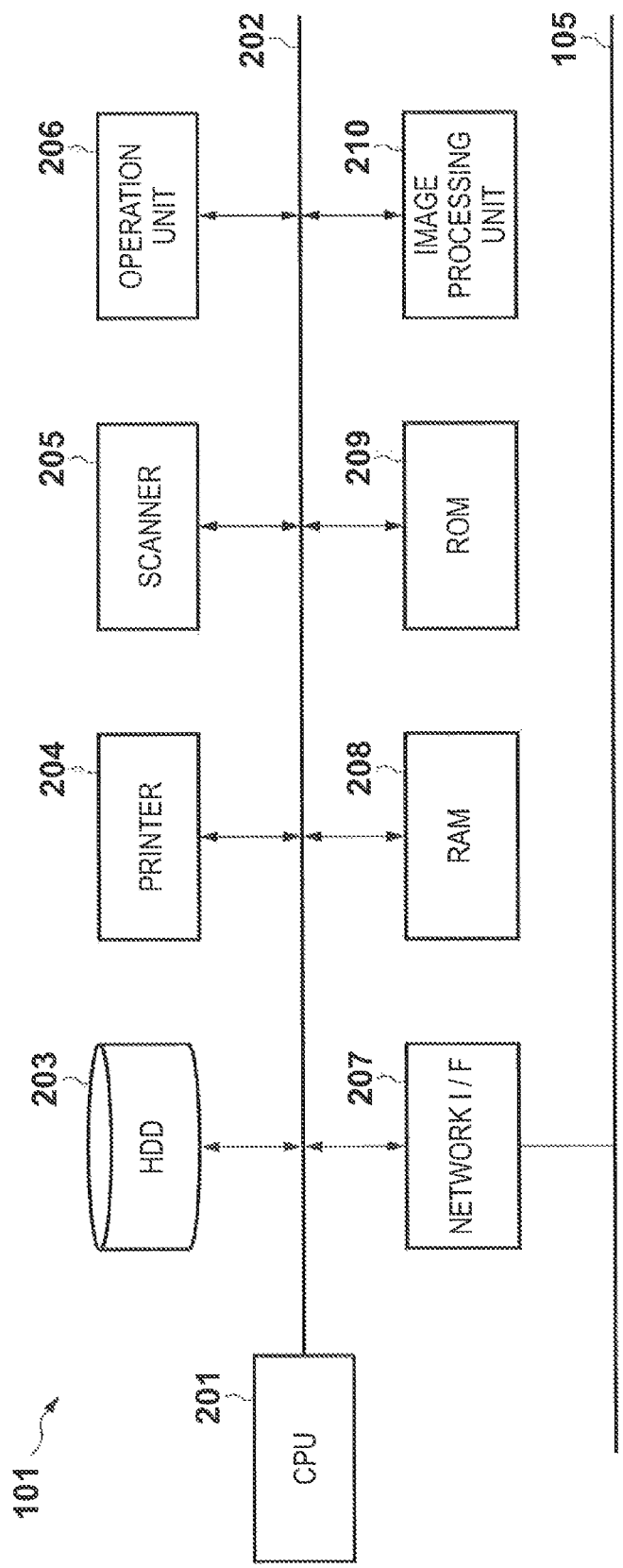
FIG. 2 is a block diagram showing an internal configuration of an image processing apparatus.

Preferred embodiments of the present invention will now be described hereinafter in detail, with reference to the accompanying drawings. It is to be understood, that the following embodiments are not intended to limit the claims of the present invention, and that not all of the combinations of the aspects that are described according to the following embodiments are necessarily required with respect to the means to solve the problems according to the present invention. Like parts are indicated by like reference characters and will not be redundantly described.

First Embodiment

In first embodiment; a job archive log will be described as an example of a log that records a history of jobs that have been executed by an image processing apparatus. The details of the job archive log will be described below. A so-called, box function, which is configured to temporarily save image data in an external storage device (HDD) for an image processing apparatus and use the temporarily saved image data, will be described by way of example.

<Overview of System>

FIG. 1 is a diagram showing a configuration of an image processing system according to this embodiment. An image processing apparatus 101 copies and prints image data read from a document, and transmits and receives image data to and from other devices. In this embodiment, the image processing apparatus 101 is a multifunction machine, for example. A service provider 102 receives a job archive log containing image data and job history information stored in the image processing apparatus 101, from an agent that operates in the image processing apparatus 101, and stores the job archive log into a data server 103. The image data and the job history information contained in the job archive log are also hereinafter referred to as an image log and a job log, respectively. Also, in this case, a conversion process and an OCR process are performed on the image data contained in the job archive log when necessary. The data server 103 accumulates and saves job archive logs transmitted from the service provider 102. The data server 103 also has a function of searching the job archive logs based on an image attribute. The data server 103 also has a function of checking whether or not confidential information is contained in image data contained in the accumulated job archive logs. A Web server 104 has a Web application for searching and browsing the job archive logs accumulated in the data server 103. The image processing apparatus 101 to the web server 104 sire connected together via a network 105 to communicate with each other. The service provider 102, the data server 103, and the Web server 104 may be, for example, a general-purpose PC.

FIG. 2 is a block diagram showing an internal configuration of the image processing apparatus 101. The image processing apparatus 101 includes a CPU 201, a bus 202, an HDD 203, a printer 204, a scanner 205, an operation unit 206, a network I/F 207, a RAM 208, a ROM 209, and an image processing unit 210. Each component will be described hereinafter. The CPU 201 loads a program stored in the ROM 209 to the RAM 208 to control the operation of the entire image processing apparatus 101. The CPU 201 also communicates with each block of the image processing apparatus 101 via the bus 202. The HDD 203 is a hard disk drive including a hard disk that is used to store various kinds of input information. Also, the job archive log of this embodiment is temporarily saved in the HDD 203. The printer 204 prints an image based on input image data onto a recording medium, such as paper etc. The scanner 205 reads an image on a document placed on the platen by the user, as a color image, and stores the resulting image data into the HDD 203, the RAM 208, etc. The scanner 205 includes a document feeder and therefore can successively feed a plurality of documents set in the document feeder onto the platen and read the documents. The scanner 205 can also perform reduction scaling in the slow scan direction by increasing scan speed or document conveyance speed. The operation unit 206 includes a plurality of keys that are used by the user to input instructions, and a display unit for notifying the user of various kinds of information. The network I/F 207 is used to connect the image processing apparatus 101 to the network 105 and control reception and transmission of data from and to external apparatuses on the network 105. The image processing unit 210 performs image processing, such as scaling, color conversion, etc., on image data stored in the RAM 203.

<Job Archive Log>

FIGS. 3A and 3B are diagrams showing an example job archive log that is recorded when the image processing apparatus 101 executes a copy job with the following settings: the paper size of document sheets is A4; the number of document sheets is three; and the number of copies is two. FIG. 3A shows image logs (image data). FIG. 3B shows a job log (job history information). An image log of FIG. 3A is recorded for each page, and a job log of FIG. 3B is recorded for each job. An image log 301 indicates image data corresponding to the first scanned document sheet. An image attribute 302 indicates an image attribute of the image log 301. The image attribute 302 contains items 303 to 305. The item 303 indicates an image format, the item 304 indicates a resolution, and the item 305 indicates sun image size. In this embodiment, it is assumed that the image format is JPEG, the resolution is 600 dpi in both X and Y, and the image size is X=4960 pixels and Y=7040 pixels. An image log 306 corresponding to the second scanned document sheet, and an image attribute 308 thereof, and an image log 307 corresponding to the third scanned document sheet and an image attribute 309 thereof, are similar to those described above.

A job log 310 contains items 311 to 319. The item 311 indicates a job type, the item 312 indicates a user ID, the item 313 indicates a job start time, and the item 314 indicates a job end time. The item 315 indicates a job execution result, the item 316 indicates the number of document sheets, and the item 317 indicates the number of output copies. The item 313 indicates an image log ID, and the item 319 indicates the presence or absence of an image log. In this embodiment, it is assumed that the job type is "copy," the user ID is "0123456789," and the job start time is "Jun 22, 2010, ten five and forty seconds (2010/06/22 10:05:40)." It is also assumed that the job end time is "Jun 22, 2010, ten five and fifty seconds (2010/06/22 10:05:50)," the job execution result is "successful completion," and the number of document sheets is "three." It is also assumed that the number of output copies is "two," the image log ID is "00000001," and the presence or absence of an image log is "present (YES)."

<Method for Limiting Use of Data Using Job Archive Log>

A method with which data stored, in the HDD 203 of the image processing apparatus 101 is controlled using a job archive log, will be described with reference to FIG. 4. FIG. 4 is a flowchart of a job archive log process and a box document use limiting process in the image processing apparatus 101 and the data server 103 when a job using a box is executed in the image processing apparatus 101. Steps S401 to S410 shown in FIG. 4 are executed by the CPU 201 of the image processing apparatus 101, for example. Steps S421 to S426 are executed by a CPU of the data server 103, for example. In this embodiment, it is assumed, that a so-called box storage job is executed in which document image data read from the scanner 205 is saved into the HDD 203.

In S401, the CPU 201 accepts, via the operation unit 206, entry of a job using a box designated by the user. In S402, the CPU 201 executes the job using a box accepted in S401. Here, the target job is, for example, the above box storage job. In S403, the CPU 201 saves document image data read from the scanner 205 into the HDD 203. The saved image data is also hereinafter referred to as a box document. In S404, the CPU 201 prohibits the use of the box document saved in the HDD 203 in S403. As a result, confidential information is prevented from being leaked by using the box document for which a security check described below has not been completed. In S405, the CPU 201 transmits a job archive log to the data server 103 via the network I/F 207 (an example of information transmission).

In S421, the data server 103 receives the job archive log from the image processing apparatus 101. (an example of information reception). In S422, the oat a server 103 stores the job archive log received in S421. In S423, the data server 103 executes a security check on the received job archive log. As used herein, the security check refers to a process of determining the presence or absence of similarity between specific information (image information or keyword information) previously stored in the data server 103 and an image log (FIG. 3A) in the received job archive log or text information obtained from the image log by character recognition. If the similarity between the image log and the specific information is greater than or equal to a predetermined threshold, the image log is determined to contain the specific information. For the image log that is determined to contain the specific information, it is also determined that there is a possibility that the image log contains confidential information. For the image thus determined, it may be determined that outputting such as printing, transmission, etc. should be limited. In S424, the data server 103 determines whether or not the job archive log is assigned an identification ID. Here, if the determination result is positive, control proceeds to S425, and otherwise, control proceeds to S426. In this embodiment, an identification ID is assigned, to a job archive log only when a job using a box in the HDD 203 (a box storage job etc.) is executed. The CPU 201 of the image processing apparatus 101 also manages, based on the identification ID, data (a box document etc.) saved in the HDD 203 in association with the determination result or a security check subsequently transmitted from the data server 103. The CPU 201 can also recognise, based on the identification ID, whether or not a security check has been performed on each piece of document data. In S425, the data server 103 notifies the image processing apparatus 101 of the result of the security check via the network 105 (an example of result transmission). In S426, of the result of the security check in S423 indicates that there is a possibility that confidential information is contained, the data server 103 notifies the data server 103 of that fact by mail.

In S406, the CPU 201 of the image processing apparatus 101 receives the security check result obtained in S423 from the data server 103 via the network I/F 207 (an example of result reception). In S407, the CPU 201 determines whether or not a box document corresponding to the security check result received in S406 is present in the HDD 203. Here, if the determination result is positive, control proceeds to S408, and otherwise, the process is ended. In S408, if the security check result received in S406 indicates that there is a possibility that the image log contains confidential information, the CPU 201 proceeds to S410, and if the security check result received in S406 indicates that the image log does not contain confidential information, the CPU 201 proceeds to S409. In S409, the CPU 201 cancels the use prohibition/limitation of the box document set in S404 to allow use of the box document. On the other hand, in S410, the CPU 201 changes the use prohibition/limitation of the box document set in S404 to a use limitation corresponding to a predetermined setting. The predetermined setting may be, for example, that the box document is allowed to be used, only by a specific user, or users belonging to a specific group. For users who are not permitted, the use of the box document may be limited. Note that the use of the box document in this embodiment includes at least any of printing of the box document and transmission of the box document. The use of the box document may also include displaying of the box document on the operation unit 206, for example. Actually, the use of the box document may be limited by limiting the user's access to the box document. Alternatively, the use of the box document may be limited as follows: when a user inputs an instruction to transmit, print, or display the box document, the instructed process is deliberately not executed.

As described, above, in this embodiment, when the image processing apparatus 101 executes a job using a box, the data server 103 executes a security check of whether or not a box document contains confidential information. Thereafter, the data server 103 notifies the image processing apparatus 101 of the security check result. If the security check result indicates that there is a possibility that the box document contains confidential information, the use of the box document is limited. As a result, when a job using a box is executed, the confidential information contained in the box document saved in the HDD 20 can be prevented from being leaked. Also, a security check is not performed every time a job using the box document is executed, and therefore, information leakage can be efficiently prevented. In this embodiment, if the security check result indicates that there is a possibility that the box document contains confidential information, the use of the box document can be limited in various manners. For example, if there is at least, one pace containing confidential information, no page may be allowed to be used, or only a page or pages containing confidential information may not be allowed to be used. Alternatively, a page containing confidential information and the subsequent pages may not be allowed to be used.

<Case where Box Document for which Security Check has not been Performed is Designated>

Next, a process will be described with reference to FIGS. 5 and 6, assuming that when a job using a designated box document saved in the HDD 203 is entered, a security check has not been executed on the designated box document.

Figure 5:
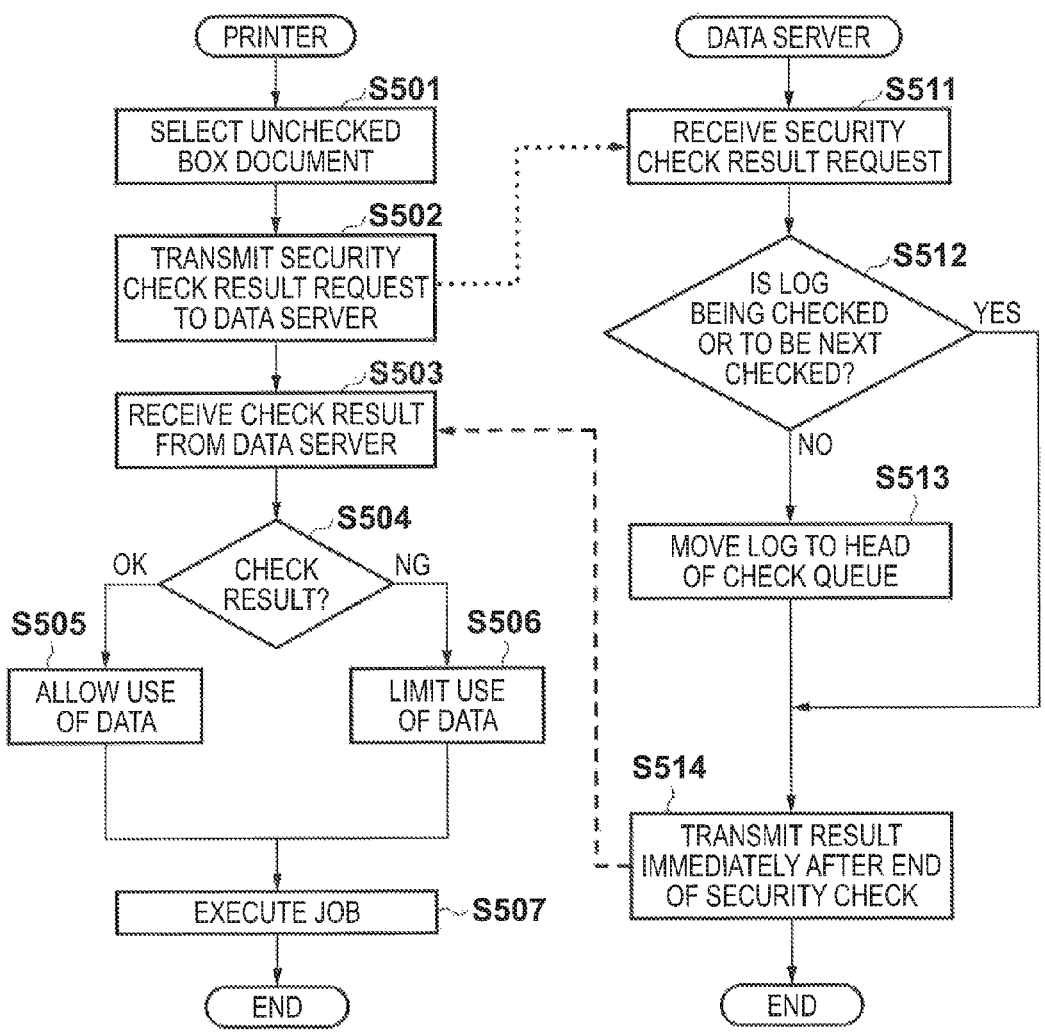
FIG. 5 is a flowchart showing a process performed when a security check has not been finished.

In the example of FIG. 5, after the box storage job of FIG. 4 is executed, a job archive log is temporarily saved in a predetermined storage area in the HDD 203. After a predetermined period of time has elapsed, the job archive log is sent via the network I/F 207 to the data server 103. FIG. 5 is a flowchart of a process performed when a security check has not been finished on a box document. Steps S501 to S507 shown in FIG. 5 are executed by the CPU 201 of the image processing apparatus 101, for example. Steps S511 to S514 are executed, by the CPU of the data server 103, for example.

In S501, the CPU 201 accepts entry of a job using a box document that is designated by a user using the operation unit 206, where a security check has not been finished on the box document. In S502, the CPU 201 requests the data, server 103, via the network I/F 207, to transmit a security check result, of the box document thereto.

In S511, the data server 103 receives a request for a security check result from the image processing apparatus 101 via the network 105. In S512, the data server 103 determines whether or not a job archive log corresponding to the received request for a security check result is being currently subjected to a security check or is to be next subjected to a security check. Here, if the determination result is positive, control proceeds to S514, and otherwise, control proceeds to S513.

In S513, the data server 103 moves the job archive log corresponding to the request that waits for a security check to the head of the security check queue. After a security check that is being currently executed is finished, a security check is executed on the job archive log corresponding to the request. In S514, sifter the security check is finished, the data server 103 transmits the security check result to the image processing apparatus 101 via the network 105.

In S503, the CPU 201 of the image processing apparatus 101 receives the security check result from the data server 103 via the network I/F 207. In S504, if the security check result received in S503 indicates that the box document does not contain confidential information, the CPU 201 proceeds to S505. On the other hand, if the security check result indicates that there is a possibility that the box document contains confidential information, the CPU 201 proceeds to S506. In S505, the CPU 201 cancels the use prohibition/limitation of the box document saved in the HDD 203 that has been designated in S501, to allow the box document to be used. On the other hand, in S506, the CPU 201 changes the use prohibition/limitation of the box document saved in the HDD 203 that has been designated in S501, to a use limitation corresponding to a predetermined setting. In S507, the CPU 201 executes the job accepted in S501.

When the job archive log for the designated box document has already been transmitted to the data server 103, then if a security check has not been finished on the box document, a control is performed to give priority to the job archive log for the box document in the order of security check in the data-server 103. As a result, when the user designates the box document, a security check is immediately executed on the job archive log for the box document, whereby the process can be more efficiently performed.

Figure 6:
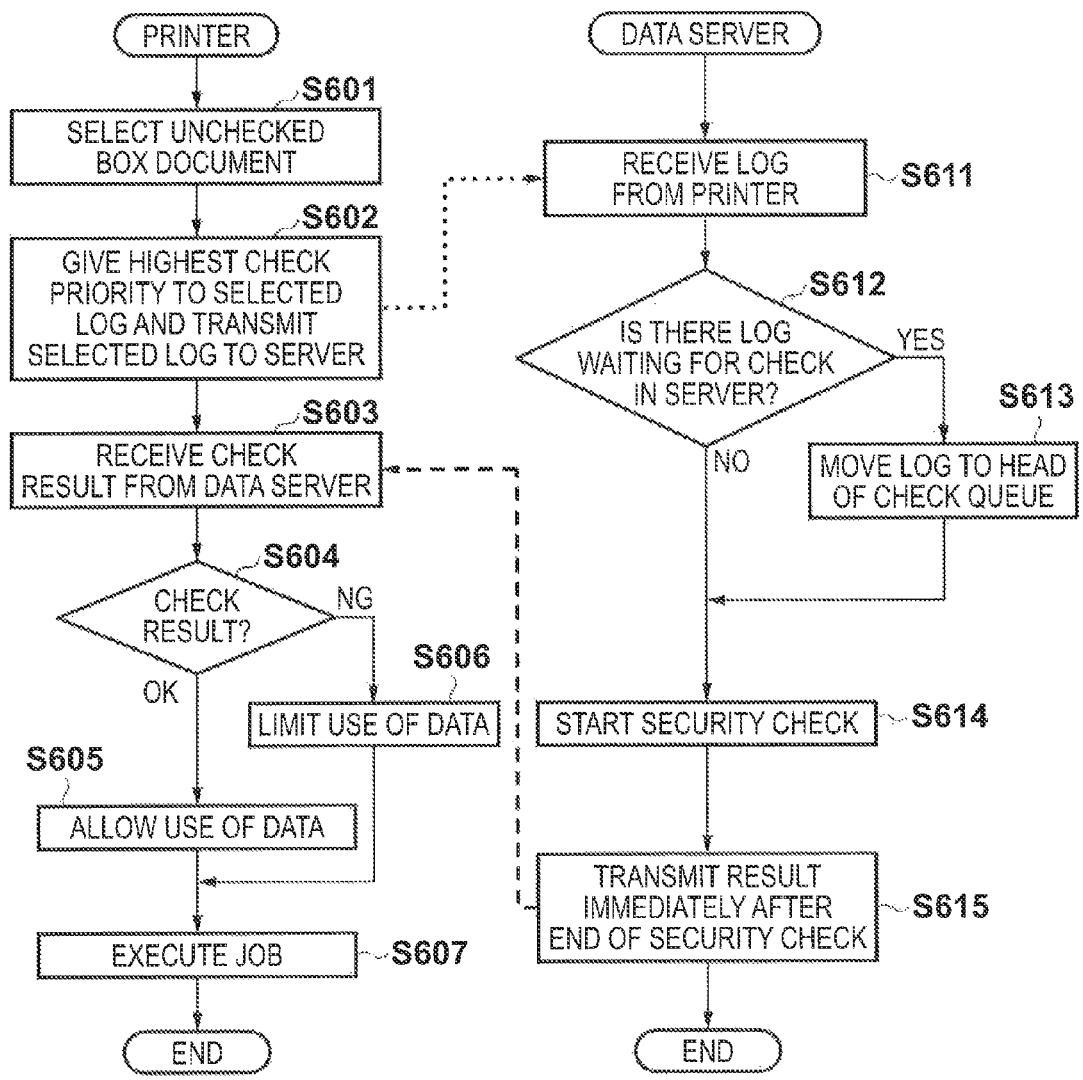
FIG. 6 is a flowchart showing another process performed when a security check has not been finished on the box document.

FIG. 6 is a flowchart of another process performed when a security check has not been finished on the box document. In the example of FIG. 6, it is assumed that a job archive log has not yet been sent to the data server 103 since the end of execution of the box storage job of FIG. 4. Steps S601 to S607 shown in FIG. 6 are executed by the CPU 201 of the image processing apparatus 101, for example. Steps S611 to S615 are executed by the CPU of the data server 103, for example.

In S601, the CPU 201 accepts entry of a job using a box document that is designated by a user using the operation unit 206, where a security check has not yet been finished on the box document. In S602, the CPU 201 transmits a job archive log for the box document temporarily saved in the HDD 203 to the data server 103 via the network I/F 207, wish a highest priority being given to the job archive log in the order of security check.

In S611, the data server 103 reserves the job archive log that has been given a highest priority in the order of security check, from the image processing apparatus 101 via the network 105. In S612, the data server 103 determines whether or not there is a job archive log currently waiting for a security check in the data server 103. Here, if the determination result is positive, control proceeds to S613, and otherwise, control proceeds to S614. In S613, the data server 103 moves the received job archive log that has been given a highest priority in the order of security check, to the hose of the security check queue. In S614, the data server 103 executes a security check on the job archive log. Step S615 and the subsequent steps are the same as step S514 and the subsequent steps of FIG. 5.

As described above, when a job archive log for a designated box document has not yet been transmitted to the data server 103 and is still present in the image processing apparatus 101, the job archive log is immediately transmitted to the data server 103. Moreover, by giving the job archive log for the box document a highest priority in the order of security check, the job archive log for the box document can be immediately subjected, to a security check.

Second Embodiment

<Case where Reprinting is Executed Using Job Archive Log>

A case where reprinting is executed using a job archive log will be described with reference to FIGS. 7 to 9A and 9B. FIG. 7 is a diagram showing a reprinting process. Steps S701 to S712 shown in FIG. 7 are executed by the CPU 201 of the image processing apparatus 101, for example. Steps S731 to S742 are executed by the CPU of the data server 103, for example. As used herein, reprinting refers to a process of printing image data on which image formation has already been performed, using a job archive log managed in the data server 103 when the user requests additional image formation, in a plurality of image processing apparatuses connected to the network 105.

In S701, the CPU 201 accepts entry of a job designated by a user using the operation unit 206. In S702, the CPU 201 determines whether or not the job accepted in S701 is a reprint, job. The reprint job refers to a job that is selected from an operation screen shown in FIGS. 12A to 12D and for which an instruction to execute the job is designated from the operation screen. The operation screen of FIGS. 12A to 12D will be described in detail, below. Here, if the determination result is positive, control proceeds to S703, and otherwise (the accepted job is a job other than reprinting), control proceeds to S708. In S703, the CPU 201 of the image processing apparatus 101 requests the data server 103, via the network I/F 207, to transmit a job archive log for the reprint job thereto.

In S736, the data server 103 receives the request for transmission of a job archive log for the reprint job from the image processing apparatus 101 via the network I/F 207. In S737, the data server 103 determines whether or not the job archive log of the reprint job has been subjected to a security check, is being subjected to a security check, or is to be next subjected to a security check. Here, if the determination result is positive, the data server 103 executes a security check and rewrites the job archive log based on the security check result, and thereafter, control proceeds to S740. If the determination result is negative, control proceeds to S738.

In S738, the data server 103 increases the security check priority level of the job archive log for which the transmission request has been received. After a security check that is being currently executed on another job archive log is finished, in S739 a security check is executed on the job archive log for which the transmission request has been received, and the job archive log is rewritten based on the execution result. In S740, the data server 103 immediately transmits the job archive log to the image processing apparatus 101 via the network I/F 207. In this case, it is determined in S739 that there is a possibility that the job archive log to be transmitted contains confidential information, the user is notified of that fact, and a process limited by confidential information is performed, including ending the job without executing outputting of reprinting, etc. The data server 103 also saves the security check result, in association with the job archive log requested, by each image processing apparatus 101. In this embodiment, when it has already been determined that there is a possibility that the job archive log requested by the image processing apparatus 101 contains confidential information, the job may be immediately ended without, being subjected to a security check and without outputting of reprinting being executed. As a result, it is no longer necessary to perform a security check every time there is a request for transmission of a job archive log from the image processing apparatus 101, and therefore, the process efficiency can be improved.

In S704, the CPU 201 of the image processing apparatus 101 receives a job archive log for a reprint job from the data server 103 via the network I/F 207. In S705, the CPU 201 prepares print settings based on information of a setting log 808 (shown in FIG. 8C) that has been received in S704 and stored in the HDD 203. In S706, the CPU 201 obtains the job archive log of the reprint job and transmits the job archive log of the reprint job to the data server 103 via the network I/F 207. In this case, the transmitted job archive log contains only a job log.

In S741, the data server 103 receives the job archive log of the reprint job from the image processing apparatus 101 via the network I/F 207. In S742, the data server 103 saves the job archive log of the reprint job.

In S707, the CPU 201 of the image processing unit 210 performs image processing on image data stored in the RAM 208, and based on the resulting image data, controls the printer 204 to print an image on a recording medium.

The details of an operation of each processing unit that is performed when a reprint job is executed have been described. A process performed when a job other than reprinting is executed will, be described hereinafter. In S708, the CPU 201 of the image processing apparatus 101 executes a job designated by the user using the operation unit 206. For example, the job is a job of printing image data read by scanning. In S709, the CPU 201 adds the job executed in S708 to a job list for reprinting. In S710, the CPU 201 transmits a job archive log to the data server 103 via the network I/F 207.

In S743, the data server 103 receives the job archive log from the image processing apparatus 101. In S744, the data server 103 stores the received job archive log. In S745, the data server 103 executes a security check on the received job archive log. In S746, the data server 103 rewrites the job archive log based on the security check result. In S747, the data server 103 transmits the security check result to the image processing apparatus 101.

In S711, the CPU 201 of the image processing apparatus 101 receives the security check result from the data server 103 via the network I/F 207. In S712, the CPU 201 rewrites a job list for reprinting based on the security check result received in S711. By rewriting the reprint job list based on the security check result, image data for which it is determined that there is a possibility that confidential information is contained, can be prevented from being displayed on the job list for a user, for example.

Note that an instruction to retransmit may be allowed to be entered from the operation screen of FIGS. 12A to 12D in addition to reprinting. In this case, in the flowchart of FIG. 7, "reprinting" may be replaced with "retransmission."

Figure 9A:
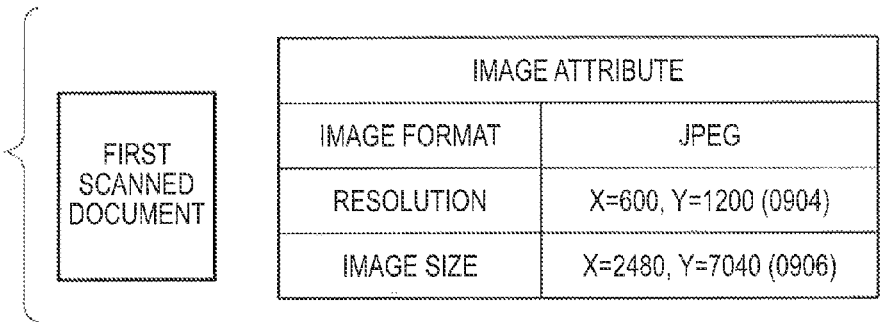
FIGS. 9A and 9E are diagrams showing other example job archive logs in second embodiment.
Figure 9B:

FIGS. 8A to 8C, 9A, and 9B are diagrams showing example job archive logs used when a 50% reduction copy is executed with the following settings; the paper size of document sheets is A4; the number of document sheets is one; and the number of copies is one. As with the above copy job, a conventional job archive log contains an image log shown in FIG. 8A and a job log shown in FIG. 8B. In this embodiment, in order to execute a reprint job using a job archive log, the job archive log further contains a setting log shown in FIG. 8C. By using the setting log of FIG. 8C, the image processing apparatus 101 can store information about print settings when the job archive log is obtained (S704). The setting log may be a setting log 801 that is additionally provided as shown in FIG. 8C or a setting log 902 that is contained in a job log 901 as shown in FIG. 9B.

As described above, the result of a security check executed, in the data server 103 is fed back to a job archive log managed in the data server 103. As a result, when a reprint job is executed using a job archive log, leakage of confidential information can be efficiently prevented.

<Process of Displaying Job List for Reprinting>

A method for creating and displaying at job list for reprinting will be described with reference to FIG. 10 through FIGS. 12A to 12D. Here, it is assumed that a plurality of image processing apparatuses 101 are connected to the network 105. Processes shown in FIG. 10 are executed by the CPU 201 of the image processing apparatus 101, for example.

Figure 10:
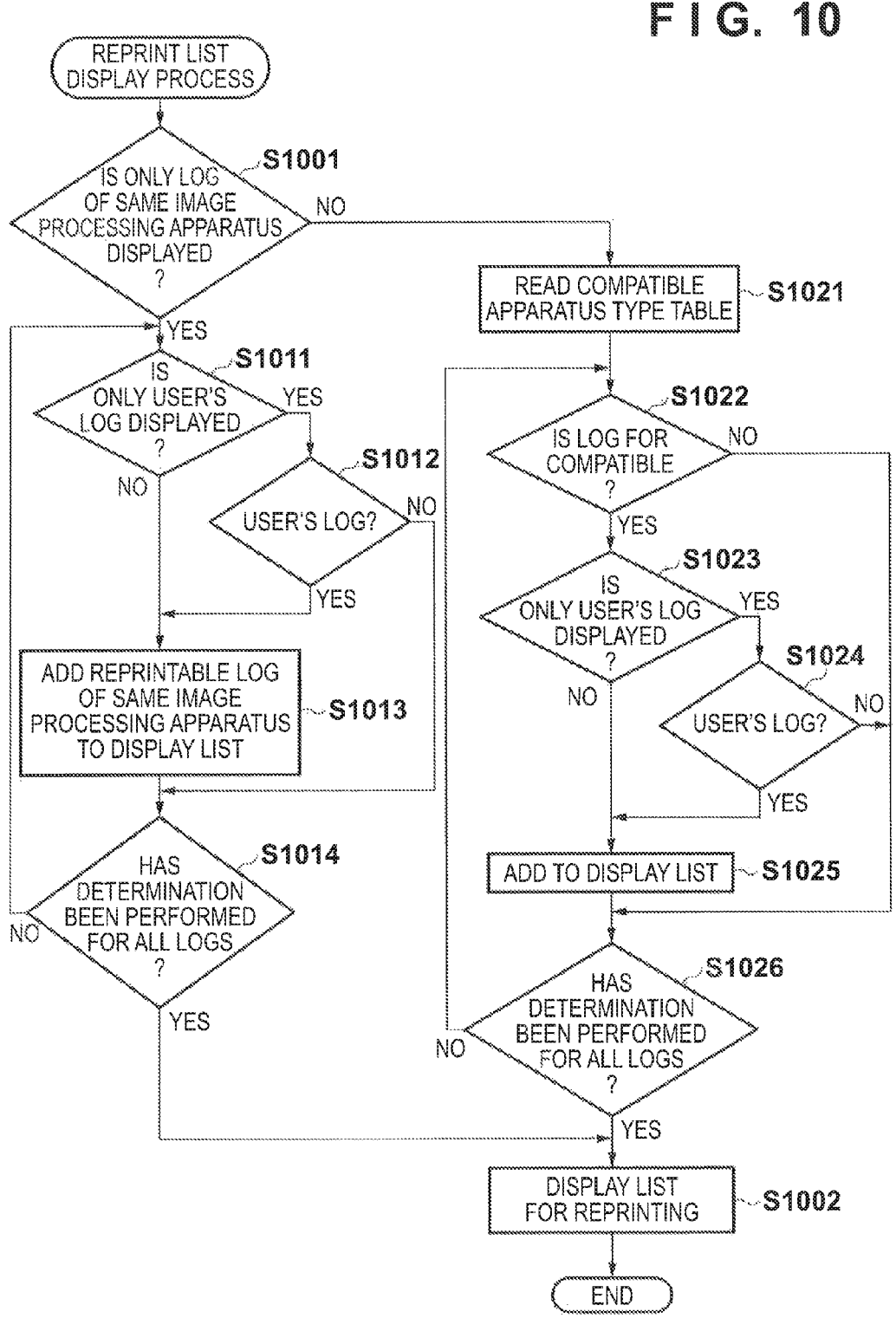
FIG. 10 is a flowchart showing a process of displaying a list in the reprinting process.

In S1001 of FIG. 10, the CPU 201 of the image processing apparatus 101 determines whether to display a list containing only a job archive log of one(s) of the image processing apparatuses 101 connected to the network 105 that is to execute a reprint job, or display a list of job archive logs of all of the image processing apparatuses 101 connected to the network 105 that are allowed to print. Here, if the CPU 201 of the image processing apparatus 101 determines to display a list containing only a job archive log of one(s) of the image processing apparatuses 101 connected to the network 105 that is to execute a reprint job, control proceeds to S1011. On the other hand, if the CPU 201 of the image processing apparatus 101 determines to display a list of job archive logs of all of the image processing apparatuses 101 connected to the network 105 that are allowed to print, control proceeds to S1021.

In S1011, the CPU 201 determines whether or not to display a list containing only a job archive log for a user who executes a reprint job. Here, if the CPU 201 determines to display a list containing only a job archive log for a user who executes a reprint job, control proceeds to S1012. On the other hand, if the CPU 201 determines to display a list of all reprintable job archive logs in the image processing apparatus 101, control proceeds to S1013. In S1012, the CPU 201 determines whether or not a reprintable job archive log of the image processing apparatus 101 is a job archive log of a job that was executed by a user in the past. A job archive log contains information about a user who issued an instruction to execute a job. Specifically, in S1012, it is determined whether or not information about a user who is currently logged in to the image processing apparatus 101 matches information about a user contained in the job archive log. Here, if the determination result is positive, control proceeds to S1013, and otherwise, control proceeds to S1014. In S1013, the CPU 201 adds a reprintable job archive log of the image processing apparatus 101 to a display list. In S1014, the CPU 201 determines whether or not the above determination has been, performed for all reprintable job archive logs in the image processing apparatus 101. Here, if the determination result is positive, control proceeds to S1002, and otherwise, control returns to S1011.

A case where it is determined in S1001 that a list of job archive logs of all image processing apparatuses 101 connected to the network 105 that are allowed to print is to be displayed, will be described. In S1021, the CPU 201 reads a compatible apparatus type table. FIG. 11 is a diagram showing an example compatible apparatus type table. Here, the compatible apparatus type table may not contain information about whether the image processing apparatus 101 is a black-and-white MFP or a color MFP or information about the ID of a network to which the image processing apparatus 101 is connected, and may contain only an apparatus type name(s) compatible to the image processing apparatus 101 for outputting.

In S1022, the CPU 201 determines whether or not a job archive log is one for an apparatus type compatible to the image processing apparatus 101 that executes a reprint job. Here, if the determination result is positive, control proceeds to S1023, and otherwise, control proceeds to S1026. In S1023, the CPU 201 determines whether or not to display, in a list, only a job archive log for a user who executes a reprint job. Here, if the determination result is positive, control proceeds to S1024, and otherwise (the CPU 201 determines to display job archive logs other than a user's job archive log), control proceeds to S1025. In S1024, the CPU 201 determines whether or not a job archive log is one for a job that has been executed by a user. Here, if the determination result is positive, control proceeds to S1025, and otherwise, control proceeds to S1026.

In S1025, the CPU 201 adds a job archive log that can be used by the image processing apparatus 101 that executes a reprint job to a display list. In S1026, the CPU 201 determines whether or not the above determination has been performed for ail reprintable job archive logs of the image processing apparatus 101. Here, if the determination result is positive, control proceeds to S1002, in which a list for reprinting is displayed on the operation unit 206, and otherwise, control proceeds to S1022.

FIGS. 12A to 12D are diagrams showing examples of the list for reprinting displayed on the operation unit 206 as a result of execution of the flowchart of FIG. 10. FIG. 12A shows an example list displayed when control proceeds from S1011 to S1013. FIG. 12B snows an example list displayed when control proceeds from S1011 to S1012. FIG. 12C shows an example list displayed, when control proceeds from S1023 to S1025. FIG. 12D shows an example list displayed when control proceeds from S1023 to S1024.

As described above, it can be efficiently determined whether or not a job archive log managed in the data server 103 can be used for reprinting, based on the type of an image processing apparatus or information about a network to which the image processing apparatus is connected, etc. As a result, when executing reprinting in an image processing apparatus, a user can easily execute the reprinting using a job archive log of another image processing apparatus, Other Embodiments Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, residing out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-100134, filed Apr. 27, 2011, which is hereby incorporated by reference herein in its entirety.

What is claimed is:

1. An image processing system comprising:
an image processing apparatus; and
a server,
wherein the image processing apparatus includes:
   a storage unit configured to store image data;
   an information transmission unit configured to transmit information about the image data to the server;
   a result reception unit configured to receive, from the server, a determination result indicating whether or not the image data contains specific information; and
   a limitation control unit configured to control use of the image data to be limited in accordance with the determination result which indicates that the image data contains the specific information,
wherein the server includes:
   an information reception unit configured to receive the information about the image data from the image processing apparatus;
   a determination unit configured to determine whether or not the image data contains the specific information; and
   a result transmission unit configured to transmit the determination result of the determination unit to the image processing apparatus, and
wherein use of the image data stored in the storage unit is limited until the result reception unit receives the determination result.

2. The image processing system of claim 1, wherein the determination unit determines whether or not the image data contains a predetermined keyword.

3. The image processing system of claim 1, wherein the storage unit stores a plurality of pieces of image data,
wherein the image processing apparatus further includes:
   a management unit configured to manage, for each of the plurality of pieces of image data, whether or not the determination result is received by the result reception unit;
   an acceptance unit configured to accept an instruction to execute a job to be executed on image data; and
   a request unit configured to, in a case where the instruction accepted by the acceptance unit is to be executed on image data for which the determination result is not received, request the server to transmit the determination result of the image data to the image processing apparatus, and
wherein the server further includes a control unit configured to, when receiving the request from the image processing apparatus, determine whether or not the image data targeted by the request contains confidential information, in priority to other pieces of image data of the plurality of pieces of image data.

4. The image processing system of claim 1, wherein the determination unit determines that there is a possibility that the image data contains confidential information, in a case where the image data is determined to contain the specific information.

5. A data control method executable in an image processing system including an image processing apparatus and a server, the data control method comprising:
   storing, by the image processing image data;
   transmitting, by the image processing apparatus, information about the image data to the server;
   receiving, by the server, the information about the image data from the image processing apparatus;
   determining, by the server, whether or not the image data contains specific information;
   transmitting, by the server, a determination result of the determination step to the image processing apparatus;
   receiving, by the image processing apparatus, from the server, the determination result indicating whether or not the image data contains the specific information; and
   controlling, by the image processing apparatus, use of the image data to be limited in accordance with the determination result which indicates that the image data contains the specific information,
wherein use of the image data by the image processing apparatus is limited until the determination result is received.

6. An image processing system comprising:
an image processing apparatus; and
a server,
wherein the image processing apparatus includes:
   a transmission unit configured to transmit, to the server, image data that has been subjected to image processing;
   a display unit configured to obtain and display information about the image data that is transmitted from the transmission unit and is stored in the server;
   an acceptance unit configured to accept selection of image data to be output, from the information displayed on the display unit;
   a request unit configured to request the server to determine whether or not image data for which selection is accepted by the acceptance unit contains specific information;
   a reception unit configured to, in a case where the server determines, in response to the request from the request unit, that the image data does not contain the specific information, receive the image data from the server; and
   a printing unit configured to print the image data received by the reception unit; and
wherein the server includes:
   a storage unit configured to store the image data transmitted from the transmission unit;
   a determination unit configured to, in a case where the server is requested by the request unit to perform the determination, determine whether or not the image data that is stored in the storage unit and for which selection has been accepted by the acceptance unit contains confidential information; and
   a transmission control unit configured to, in a case where the determination unit determines that the image data does not contain confidential information, transmit the image data to the image processing apparatus.

7. An image processing apparatus capable of communicating with a server, comprising:
a storage unit configured to store image data;
a transmission unit configured to transmit information about the image data to the server;

a reception unit configured to receive, from the server, a determination result indicating whether or not the image data contains specific information; and a limitation control unit configured to control use of the image data to be limited in accordance with the determination result which indicates that the image data contains the specific information, wherein use of the image data stored in the storage unit is limited until the reception unit receives the determination result.

8. A server capable of communicating with an image processing apparatus, comprising:

a reception unit configured to receive information about image data from the image processing apparatus;

a determination unit configured to determine whether or not the image data contains specific information; and a transmission unit configured to transmit, a determination result of the determination unit to the image processing apparatus, wherein use of the image data by the image processing apparatus is limited until the transmission unit transmits the determination result to the image processing apparatus.

9. A data control method executable in an image processing apparatus capable of communicating with a server, the data control method comprising:

storing image data;

transmitting information about the image data to the server;

receiving, from the server, a determination result indicating whether or not the image data contains specific information; and controlling use of the image data to be limited in accordance with the determination result which indicates that the image data contains the specific information, wherein use of the stored image data is limited until the determination result is received.

10. A data control method executable in a server capable of communicating with an image processing apparatus, the data control method comprising:

receiving information about image data from the image processing apparatus;

determining whether or not the image data contains specific information; and transmitting a determination result of the determination step to the image processing apparatus, wherein use of the image data of the image processing apparatus is limited until the determination result is transmitted to the image processing apparatus.

11. A computer readable storage medium storing a program that causes a computer to execute a data control method executable in an image processing apparatus communicating with a server, the data control method comprising:

storing image data;

transmitting information about the image data, to the server;

receiving, from the server, a determination result indicating whether or not the image data contains specific information; and controlling use of the image data to be limited in accordance with the determination result which indicates that the image data contains the specific information, wherein use of the stored image data by the image processing apparatus is limited until the determination result is received.

12. A computer readable storage medium storing a program that causes a computer to execute a data control method executable in a server communicating with an image processing apparatus, the data control method comprising:

receiving information about image data from the image processing apparatus;

determining whether or not the image data contains specific information; and transmitting a determination result of the determination step to the image processing apparatus, wherein use of the image data by the image processing apparatus is limited until the determination result is transmitted to the image processing apparatus.

* * * * *